Figure 1:
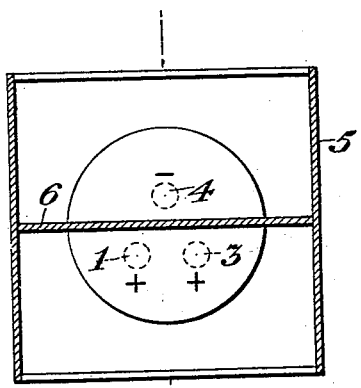

No. 750,892. PATENTED FEB. 2, 1904.
M. VON RECKLINGHAUSEN.
GAS OR VAPOR ELECTRIC APPARATUS.
APPLICATION FILED OCT. 17, 1903.
NO MODEL.

Witnesses
Chas. F. Clagett
W. H. Capel

Inventor
Max von Recklinghausen
By his Attorney
Charles A. Terry

No. 750,892. Patented February 2, 1904.

UNITED STATES PATENT OFFICE.

MAX VON RECKLINGHAUSEN, OF NEW YORK, N. Y., ASSIGNOR TO COOPER HEWITT ELECTRIC COMPANY, A CORPORATION OF NEW YORK.

GAS OR VAPOR ELECTRIC APPARATUS.

SPECIFICATION forming part of Letters Patent No. 750,892, dated February 2, 1904.

Application filed October 17, 1903. Serial No. 177,399. (No model.)

*To all whom it may concern:*

Be it known that I, MAX VON RECKLINGHAUSEN, a subject of the Emperor of Germany, and a resident of New York, county of New York, State of New York, have invented certain new and useful Improvements in Gas or Vapor Electric Apparatus, of which the following is a specification.

In using a mercury-vapor converter of the spherical type it is somewhat difficult to keep the mercury-electrodes evenly filled, for the reason that these electrodes give off mercury-vapor at different rates. Owing to the greater heating which takes place at the positive electrodes, the latter give off vapor more rapidly than the negative electrodes, from which it results that if the redistribution of the condensed mercury is left to itself in an apparatus of this character the negative electrode is likely to become overfilled at the expense of the positive electrodes. It is possible to cause the excess of mercury thus entering the negative electrode to flow over into the positive electrode or electrodes, which entails the danger of a short circuit, which it is desirable to avoid.

The present invention is designed to provide means whereby the positive electrodes may in the first instance obtain their full share of the returning condensations, and the means which I employ depend upon the principle of creating a comparatively large cooling or condensing effect above the positive electrode or electrodes as compared with that produced above the negative electrode. For example, if a current of air or oil be utilized for producing an artificial cooling in the converter the said current may be so directed as to first affect that part of the converter which is located above the positive electrode or electrodes and may then after becoming somewhat heated pass into contact with those parts of the converter which stand above the negative electrode. In this way the desired increase of condensation at the point where such condensation will naturally be restored to the electrodes which are most seriously depleted is brought about.

The particular mode herein suggested for the accomplishment of the purpose indicated is that of inclosing the converter in a box and putting a partition into the space between the box and the converter, leaving a small open space at the bottom through which the current of air or oil or other cooling medium may pass. Care is then taken that the cooling agent shall first enter and pass through the box on one side of the partition and pass out at the other, the entering side being that on which the positive electrode or electrodes are located.

Figure 2:
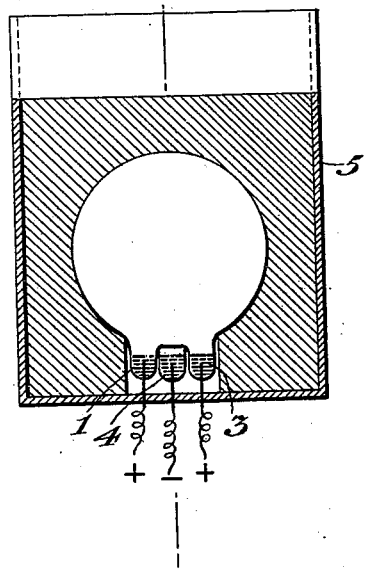
Figure 3:
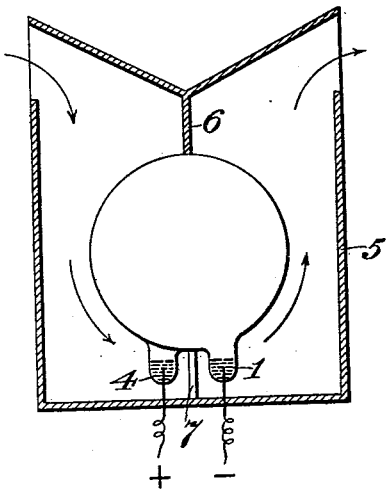
Figure 4:
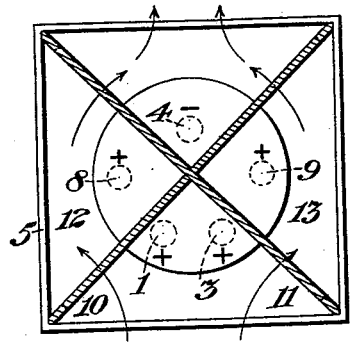

The invention is illustrated in Figures 1, 2, and 3, which represent, respectively, a plan, a cross-section along the line 2 2 in Fig. 1, and a cross-section along the line 3 3 in Fig. 1, and in Fig. 4, which shows a modification.

In the drawings is shown a converter of generally spherical form, the same being made of any suitable material. The positive electrodes are shown at 1, 2, and 3 and the negative electrodes at 4, the same being located in special receptacles or extensions at the bottom of the converter. The converter is inclosed within a box 5, across which extends a partition 6, which practically fills the space between the side walls of the box and the outer walls of the converter on the opposite sides. There is an opening at 7 in the partition, through which the air or liquid which is used for cooling purposes may pass from one side of the converter to the other.

In practice the cooling medium is caused to enter the box on that side of the partition on which the positive electrodes are located, by reason of which arrangement the corresponding side of the converter has applied to it the full cooling effect of the fluid employed. After passing along that side of the converter the fluid traverses the opening 7 and passes up the converter on the opposite side. Inasmuch, however, as the cooling medium has during the described process absorbed considerable heat, the remote side of the converter is less influenced by the said medium and the condensation on that side is correspondingly less. By a proper application of the process indicated to the cooling of a spherical converter the distribution of the condensations which take place therein may be rendered substantially even and uniform.

The described process is applicable to any form of vapor apparatus which is traversed by an electric current and in which vapors are generated by the passage of such current, provided only that the arrangement is such as to permit of the exposure of those portions of the apparatus which contain the positive electrodes to a preferably greater degree of condensation than the portions which contain the negative electrode. It is also true that the invention is applicable to types of apparatus which may use some condensable vapor other than mercury vapor in their operation.

Should it be desired to employ auxiliary positive electrodes, as 8 and 9, requiring a less rapid condensation of the vapors above them, several partitions might be provided, as indicated in Fig. 4, the cooling fluid entering first the chamber between the partitions 10 and 11, then passing into the chambers indicated at 12 and 13, and finally passing out past the negative electrode, as before. In any case the object is to supply to the spaces above the several electrodes cooling effects corresponding to the needs or requirements of the electrodes of that particular section of the apparatus.

I claim as my invention—

1. The combination with a vapor apparatus having volatilizable positive and negative electrodes, of means for exposing the space above the several electrodes to different degrees of cooling corresponding to the rapidity of evaporation of the said electrodes.

2. The combination with a vapor apparatus having volatilizable positive and negative electrodes, of means for exposing the space above the respective positive and negative electrodes to different degrees of cooling.

3. The combination with a vapor apparatus having positive and negative electrodes of volatilizable material, of means whereby a current of cooling fluid may first be applied to the space above the positive electrode or electrodes and afterward to the space above the negative electrode or electrodes.

4. The combination with a vapor apparatus having positive and negative electrodes of volatilizable material, of an inclosing box, one or more partitions occupying the spaces between the box and the converter-walls, the said partition or partitions being provided with openings, as described, and being so placed as to separate the sections above the electrodes into a series of chambers or groups of chambers, and means for circulating the cooling fluid through the said chambers or groups of chambers in the order of the rapidity of evaporation of the electrodes contained therein.

Signed at New York, in the county of New York and State of New York, this 9th day of October, A. D. 1903.

MAX VON RECKLINGHAUSEN.

Witnesses:
WM. H. CAPEL,
GEORGE H. STOCKBRIDGE.